(12) United States Patent
Lin

(10) Patent No.: US 8,588,099 B2
(45) Date of Patent: Nov. 19, 2013

(54) METHOD FOR INHERITING ATTRIBUTE OF FORWARDING ADJACENCY IN MULTILAYER NETWORK AND CORRESPONDING MULTILAYER NETWORK

(75) Inventor: Xuefeng Lin, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 72 days.

(21) Appl. No.: 13/257,812

(22) PCT Filed: May 5, 2010

(86) PCT No.: PCT/CN2010/072461
§ 371 (c)(1),
(2), (4) Date: Dec. 7, 2011

(87) PCT Pub. No.: WO2011/017945
PCT Pub. Date: Feb. 17, 2011

(65) Prior Publication Data
US 2012/0076046 A1 Mar. 29, 2012

(30) Foreign Application Priority Data
Aug. 13, 2009 (CN) .......................... 2009 1 0167307

(51) Int. Cl.
*G06F 15/173* (2006.01)
(52) U.S. Cl.
USPC ........... 370/252; 370/463; 370/465; 709/226; 709/238
(58) Field of Classification Search
USPC ......... 370/252, 254, 351, 389, 392, 400, 401, 370/431, 463–465; 709/226, 230, 238
See application file for complete search history.

(56) References Cited

U.S. PATENT DOCUMENTS 7,855,950 B2 * 12/2010 Zwiebel et al. ............... 709/230
8,208,372 B2 * 6/2012 Vasseur et al. ................ 370/225
(Continued)

FOREIGN PATENT DOCUMENTS

CN 101036355 A 9/2007
CN 101330448 A 12/2008
(Continued)

OTHER PUBLICATIONS

International Search Report for PCT/CN2010/072461 dated Jul. 13, 2010.
(Continued)

*Primary Examiner* — Kerri Rose
(74) *Attorney, Agent, or Firm* — Ling Wu; Stephen Yang; Ling and Yang Intellectual Property

(57) ABSTRACT

The present invention provides a method for inheriting an attribute of a FA in a multilayer network, which comprises: returning information of a first attribute of each link on a FA LSP in a path computation reply message to an upper layer head node, and initiating connection setup; a head node on the FA LSP constructing the first attribute of this FA according to information of the first attribute of each link on the FA LSP included in a path message sent from a upstream node and storing the first attribute of this FA, and sending information of the first attribute of this FA to a downstream node; and c) the tail node on the FA LSP obtaining information of the first attribute of this FA and storing the first attribute of this FA. The present invention also provides a multilayer network.

20 Claims, 2 Drawing Sheets

(56) References Cited

U.S. PATENT DOCUMENTS

| | | |
|---|---|---|
| 2003/0081589 A1 | 5/2003 | Marian et al. |
| 2006/0215660 A1 | 9/2006 | Vigoureux et al. |
| 2009/0161681 A1* | 6/2009 | Madrahalli et al. ........... 370/401 |

FOREIGN PATENT DOCUMENTS

| | | |
|---|---|---|
| CN | 101588288 A | 11/2009 |
| EP | 2056526 A1 | 5/2009 |
| EP | 2075966 A1 | 7/2009 |
| WO | 2006060184 A2 | 6/2006 |

OTHER PUBLICATIONS

X. Lin et al. "A Path Computation Element (PCE) Solution for multilayer lsp draft-lin-pce-ccamp-multilayer-Isp-00", CCAMP and PCE Working Group; ZTE Corporation, Oct. 19, 2009, see pp. 1-12.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|L|    type   |    length     |            Reserved             |
+-+-+-+-+-+-+-+-+-+-+-+-+-+-+-+-+-+-+-+-+-+-+-+-+-+-+-+-+-+-+-+-+
~                              TLVs                              ~
+-+-+-+-+-+-+-+-+-+-+-+-+-+-+-+-+-+-+-+-+-+-+-+-+-+-+-+-+-+-+-+-+
```

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     type      |    length     |            Reserved           |
+-+-+-+-+-+-+-+-+-+-+-+-+-+-+-+-+-+-+-+-+-+-+-+-+-+-+-+-+-+-+-+-+
~                              TLVs                              ~
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                         LSR's Router ID                        |
+-+-+-+-+-+-+-+-+-+-+-+-+-+-+-+-+-+-+-+-+-+-+-+-+-+-+-+-+-+-+-+-+
|                        Interface ID (32 bit)                   |
+-+-+-+-+-+-+-+-+-+-+-+-+-+-+-+-+-+-+-+-+-+-+-+-+-+-+-+-+-+-+-+-+
|    Actions    |                   Reserved                     |
+-+-+-+-+-+-+-+-+-+-+-+-+-+-+-+-+-+-+-+-+-+-+-+-+-+-+-+-+-+-+-+-+
~                              TLVs                              ~
+-+-+-+-+-+-+-+-+-+-+-+-+-+-+-+-+-+-+-+-+-+-+-+-+-+-+-+-+-+-+-+-+
```

FIG. 3

METHOD FOR INHERITING ATTRIBUTE OF FORWARDING ADJACENCY IN MULTILAYER NETWORK AND CORRESPONDING MULTILAYER NETWORK

TECHNICAL FIELD

The present invention relates to the multilayer network technique of the transmission network, and particularly, to a method for implementing inheritance of an attribute of Forwarding Adjacency (FA) in a multilayer network and a corresponding multilayer network.

BACKGROUND OF THE RELATED ART

With the continuous development of the transport network, the network topology is more and more complex, and the traffic becomes larger and larger. In order to satisfy the requirements of different service scheduling granularities, the Automatic Switch Optical Network (ASON) network supports various switching capabilities and service scheduling in different speeds under each switching capability. The supports for various switching capabilities and different speeds under each switching capability compose the multilayer network, e.g. the Multi-Protocol Label Switching (MPLS) and the Generalized Multiprotocol Label Switching (GMPLS) multilayer networks.

One Label Switched Path (LSP) is set up in the border node of the layer, and if this LSP is taken as a Traffic Engineering (TE) link of the upper layer to carry out the flooding, this LSP is called as a FA LSP, and this TE link is called as a Forwarding Adjacency (FA). A routing adjacency relationship does not exist between endpoints of the FA, but a signaling adjacency relationship exists.

The FA LSP can be set up automatically, and also can be set up manually.

The way of setting up the FA LSP manually is making a plan and configuration in advance. The greatest shortcoming of this way is not flexible sufficiently, or is unable to achieve the optimal resource utilization efficiency of the whole network.

The way of setting up the FA LSP automatically can adopt three ways of the Path Compute Element-Virtual Network Topology Manager (PCE-VNTM) coordination model, the Network Manager System-Virtual Network Topology Manager (NMS-VNTM) coordination model or the upper layer signaling triggered module. Both of the former two ways introduce the VNTM. However, the introduction of the VNTM will bring a layout difficulty, increase contents which requires coordinating and interacting, and increase connection setup time and instability.

When the upper layer signaling triggered module is adopted, the FA LSP is adopted as an upper layer TE link, and the FA attributes which can be inherited by the upper layer TE link include the interface switching capability, the TE link cost, the maximal LSP bandwidth of each priority, the unused bandwidth of all the priorities, the maximal reserved bandwidth, the protection attribute, the minimal LSP bandwidth (depending on the switching capability) and the Shared Risk Link Group (SRLG) and so on.

The interface switching capability of the FA inherits the interface switching capability of the nearest endpoint to the TE link composing the FA, and once the FA LSP is set up, the maximal LSP bandwidth of each priority, the unused bandwidth of all the priorities, the maximal reserved bandwidth and the minimal LSP bandwidth can be inherited. These attributes of the FA do not require constructing and obtaining according to corresponding attributes of each link on the FA LSP.

However, at present, there is not a corresponding scheme about how to inherit the TE link cost of the FA, the protection attribute, and the Shared Risk Link Group attribute and so on yet.

SUMMARY OF THE INVENTION

The technical problem to be solved in the present invention is to provide a method and system for inheriting an attribute of a Forwarding Adjacency in a multilayer network, which is for implementing the inheritance of attributes of the FA which require constructing and obtaining according to corresponding attributes of each link on the FA LSP in the upper layer signaling triggered model.

In order to solve the above problem, the present invention provides a method for inheriting an attribute of a Forwarding Adjacency (FA) in a multilayer network, the multilayer network adopts an upper layer signaling triggered model to set up the FA, and the method for inheriting the attribute comprises:

a) a path compute element returning information of a first attribute of each link on a Forwarding Adjacency Label Switched Path (FA LSP) included in a computed path in a path computation reply message to an upper layer head node initiating the inquiry, where the first attribute is a part of attributes requiring constructing and obtaining according to corresponding attributes of each link on the FA LSP among attributes of the FA; the upper layer head node initiating connection setup according to the path;

b) a head node on the FA LSP constructing the first attribute of the FA according to the information of the first attribute of each link on the FA LSP included in a path message sent from a upstream node, storing the first attribute of the FA and sending information of the first attribute of the FA to a tail node on the FA LSP by the path message; and c) the tail node on the FA LSP obtaining the information of the first attribute of the FA from said path message and storing the information of the first attribute of the FA.

The above method further comprises:

before step a), expanding an Explicit Route Object (ERO) in a resource reservation protocol and a path computation element communication protocol, and adding a FA LSP subobject;

wherein, in step a), the information of the first attribute of each link on said FA LSP in the path computation reply message is encapsulated in the FA LSP subobject of an ERO object corresponding to a node on the FA LSP;

wherein, in step b), the information of the first attribute of each link on said FA LSP in said path message is encapsulated in the FA LSP subobject of the ERO object corresponding to the node on the FA LSP.

Wherein, said step of sending information of the first attribute of the FA to the tail node on the FA LSP by the path message comprises: the head node on said FA LSP encapsulating the information of the first attribute of the FA in a LSP tunnel interface identification object in the path message, and sending the path message to the tail node on the FA LSP through an intermediate node on said FA LSP.

Wherein, the first attribute of said FA includes one or any combination of a Traffic Engineering (TE) cost, a protection attribute and a shared risk link group attribute.

Wherein, the protection attribute of said FA is equal to a protection attribute with minimal protection capacity among protection attributes of each link on the FA LSP, and the protection attributes of each link are extra services, unprotected, shared protection, dedicated 1:1 protection, dedicated 1+1 protection and enhanced protection ranked from small to large protection capacities.

The above method further comprises:

before step a), said upper layer head node adding indication information for indicating that the path compute element is required to return the information of the first attribute of each link on the FA LSP in a path computation request sent to the path compute element; in step a), when the path computation request includes said indication information and the computed paths include the FA LSP, said path computation element returning the information of the first attribute of each link on the FA LSP to said upper layer head node.

The present invention also provides a method for inheriting an attribute of a Forwarding Adjacency (FA) in a multilayer network, the multilayer network adopts an upper layer signaling triggered model to set up the FA, and the method for inheriting the attribute comprises:

A) in a connection setup process of a Forwarding Adjacency Label Switched Path (FA LSP), each node on the FA LSP adding information of a first attribute of a link between the node and a downstream adjacent node in a path message sent to the downstream adjacent node, the first attribute being a part of attributes requiring constructing and obtaining according to corresponding attributes of each link on the FA LSP in the FA, and a tail node of the FA LSP obtaining information of the first attribute of each link on the FA LSP from said path message, constructing the first attribute of the FA and storing the first attribute of the FA; and B) each node on the FA LSP adding information of a first attribute of a link between the node and an upstream adjacent node in a reservation (Resv) message sent to the upstream adjacent node, a head node of the FA LSP obtaining information of the first attribute of each link on the FA LSP from said Resv message, constructing the first attribute of the and storing the first attribute of the FA.

The above method further comprises:

before step A), expanding a Record Route Object (RRO) in a resource reservation protocol, and adding a FA LSP subobject;

wherein, in step A), the information of the first attribute of the link between the node and the downstream adjacent node in said path message is added in the FA LSP subobject of the RRO corresponding to the node;

wherein, in step b), the information of the first attribute of the link between the node and the upstream adjacent node in said Resv message is added in the FA LSP subobject of the RRO corresponding to the node.

Wherein, the first attribute of said FA includes one or any combination of a Traffic Engineering (TE) cost, a protection attribute and a shared risk link group attribute.

Wherein, the protection attribute of said FA is equal to a protection attribute with minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

The present invention also provides a multilayer network for implementing inheritance of an attribute of a Forwarding Adjacency (FA), the multilayer network adopts an upper layer signaling triggered model to set up the FA, the multilayer network comprises a path compute element and each node on a Forwarding Adjacency Label Switched Path (FA LSP), and said each node comprises a head node and a tail node, wherein:

said path compute element is configured to: return information of a first attribute of each link on the FA LSP included in computed paths in a path computation reply message to an upper layer head node initiating the inquiry, and the first attribute is a part of attributes requiring constructing and obtaining according to corresponding attributes of each link on the FA LSP in the FA, and the information of the first attribute of each link on the FA LSP is encapsulated in a FA LSP subobject of an Explicit Route Object (ERO) object corresponding to the node on the FA LSP;

the head node on said FA LSP is configured to: construct the first attribute of the FA according to the information of the first attribute of each link on the FA LSP encapsulated in the FA LSP subobject of the ERO object corresponding to the node on the FA LSP in a path message sent from an upstream node and store the first attribute of the FA, and encapsulate the information of the first attribute in the FA LSP subobject of the ERO object corresponding to the node on the FA LSP in the path message, and send the path message to the tail node on the FA LSP;

the tail node on said FA LSP is configured to: obtain the information of the first attribute of the FA from said path message and store the information of the first attribute of the FA.

Wherein, the first attribute of said FA includes one or any combination of a Traffic Engineering (TE) cost, a protection attribute and a shared risk link group attribute; wherein the protection attribute of said FA is equal to a protection attribute with minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

The present invention also provides a multilayer network for implementing inheritance of an attribute of a Forwarding Adjacency (FA), the multilayer network adopts an upper layer signaling triggered model to set up the FA, and the multilayer network comprises each node on a Forwarding Adjacency Label Switched Path (FA LSP), wherein:

a head node of said FA LSP is configured to: add information of a first attribute of a link between the node and a downstream adjacent node in a FA LSP subobject of a Record Route Object (RRO) corresponding to the node in a path message sent to the downstream adjacent node, and obtain the information of the first attribute of each link on the FA LSP from a reservation (Resv) message, construct the first attribute of the FA and store the first attribute of the FA;

an intermediate node of said FA LSP is configured to: add information of a first attribute of a link between the node and a downstream adjacent node in the FA LSP subobject of the RRO corresponding to the node in the path message sent to the downstream adjacent node, and add information of a first attribute of a link between the node and an upstream adjacent node in the FA LSP subobject of the RRO corresponding to the node fin the Resv message sent to the upstream adjacent node;

a tail node of said FA LSP is configured to: add information of a first attribute of a link between the node and an upstream adjacent node in the FA LSP subobject of the RRO corresponding to the node in the Resv message sent to the upstream adjacent node; and obtain the information of the first attribute of each link on the FA LSP from the path message, construct the first attribute of the FA and store the first attribute of the FA;

said first attribute is a part of attributes requiring constructing and obtaining according to corresponding attributes of each link on the FA LSP among attributes of the FA.

Wherein, the first attribute of said FA includes one or any combination of a Traffic Engineering (TE) cost, a protection attribute and a shared risk link group attribute; wherein the protection attribute of said FA is equal to a protection attribute with minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

The present invention also provides a node for implementing inheritance of an attribute of a Forwarding Adjacency (FA), and said node is configured to:

when the node acts as a head node, add information of a first attribute of a link between the node and a downstream adjacent node in a FA LSP subobject of a Record Route Object (RRO) corresponding to the node in a path message sent to the downstream adjacent node, and obtain the information of the first attribute of each link on the FA LSP from a reservation (Resv) message, construct the first attribute of the FA and store the first attribute of the FA; or when the node acts as an intermediate node, add information of a first attribute of a link between the node and a downstream adjacent node in the FA LSP subobject of the RRO corresponding to the node in the path message sent to the downstream adjacent node, and add information of a first attribute of a link between the node and an upstream adjacent node the FA LSP subobject of the RRO corresponding to the node in the Resv message sent to the upstream adjacent node; or when the node acts as a tail node, add information of a first attribute of a link between the node and an upstream adjacent node the FA LSP subobject of the RRO corresponding to the node in the Resv message sent to the upstream adjacent node; and obtain information of the first attribute of each link on the FA LSP from the path message, construct the first attribute of the FA and store the first attribute of the FA;

said first attribute is a part of attributes requiring constructing and obtaining according to corresponding attributes of each link on the FA LSP among attributes of the FA.

Compared with the prior art, the above scheme expands the Explicit Route Object (ERO) in the Resource reSerVation Protocol (RSVP) and the Path Computation Element communication Protocol (PCEP), adds the FA LSP subobject, expands the Record Route Object (RRO) in the RSVP, and adds the FA LSP subobject, and the FA LSP subobject includes the Type, Length, Value (TLV) of the FA attributes, and the above scheme provides newly expanded subobjects, has the PCEP protocol and the RSVP protocol coordinated, and implements the inheritance of attributes of the FA which require constructing and obtaining according to corresponding attributes of each link on the FA LSP in the upper layer signaling triggered FA LSP automatic setup model.

BRIEF DESCRIPTION OF DRAWINGS

FIG. 1 is a schematic diagram of the subobject FA subobject of the expanded ERO object according to the example of the present invention;

FIG. 2 is a schematic diagram of the subobject FA subobject of the expanded RRO object according to the example of the present invention;

FIG. 3 is a schematic diagram of the LSP_TUNNEL_INTERFACE_ID object used in the example of the present invention;

PREFERRED EMBODIMENTS OF THE PRESENT INVENTION

Figure 4:
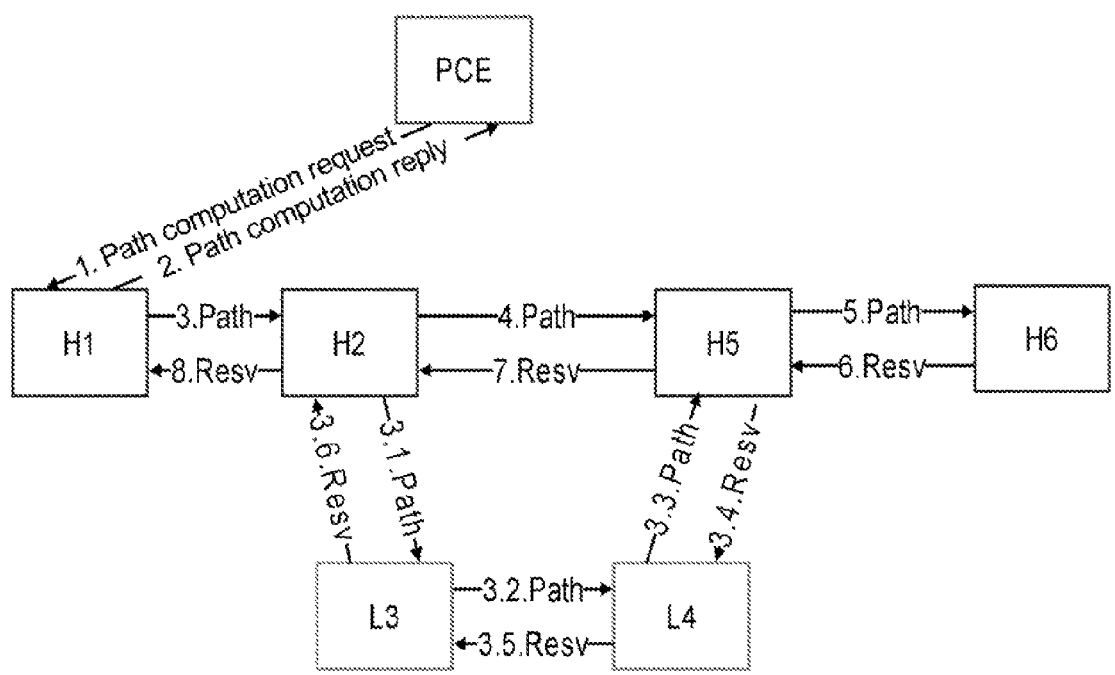
FIG. 4 is a flow chart of setting up the FA LSP and inheriting the FA attributes in a scenario of the upper layer signaling triggered module applying the example of the present invention.

It will describe examples of the present invention with reference to figures below.

Example One

As shown in FIG. 1, this example expands the Explicit Route Object (ERO) in the Resource reSerVation Protocol (RSVP) and the Path Computation Element communication Protocol (PCEP), and adds a FA LSP subobject; in the TLV of the FA LSP subobject, the link attribute information of the FA LSP is filled. Each link attribute among the TE link cost, protection attribute, and Shared Risk Link Group attribute is taken as one Type, Length, Value (TLV), and there can be a plurality of TLVs. The particular format of the TLV of the TE link cost, protection attribute, and Shared Risk Link Group parameters can refer to definitions in the RFC3630 and RFC4203 standards.

It is required to obtain TE link cost of each link on the FA LSP to obtain the TE link cost of the FA, and so do the protection attribute and the Shared Risk Link Group attribute, and the following text is referred to for particular construction way. Although this example takes the TE link cost, protection attribute and Shared Risk Link Group attribute as an example, the present invention is not limited to this, and for other attributes which require constructing and obtaining according to corresponding attributes of each link on the FA LSP, of the FA, inheritances can also be implemented by adopting schemes of the examples one and two.

FIG. 4 shows a multilayer network on which this example is based, and shows the flow of transmitting signaling among nodes, and with reference to this figure, the flow of the method for inheriting attributes of the FA in this example comprises:

step 1, when the upper layer head node H1 sets up the upper layer service, a path computation request is sent to the Path Compute Element (PCT);

indication information can be added to this path computation request for indicating that the PCE is required to return information of the TE link cost, protection attribute and Shared Risk Link Group attribute of each link on the FA LSP.

Step 2, after receiving the path computation request, the PCE returns the computed path information to the upper layer head node H1 in the path response message, and when this path includes the FA LSP, the PCE also returns information of the TE link cost, protection attribute and Shared Risk Link Group attribute of each link on the FA LSP to the upper layer head node H1;

the PCE can search whether the path computation request includes the above indication information, and returns information of the TE link cost, protection attribute and Shared Risk Link Group attribute to the upper layer head node H1 only when the path computation request includes the above indication information. Certainly, in another example, the PCE also can return the above attribute information of each link on the FA LSP to said upper layer head node at once when the computed path includes the FA LSP.

With reference to FIG. 4, the computed path of this upper layer service in this example is H1-H2-L3-L4-H5-H6, wherein FA LSP composed of nodes H2-L3-L4-H5 is included, wherein the H2 and H5 are border nodes. The information of the TE link cost, protection attribute and Shared Risk Link Group attribute of each link on the FA LSP is encapsulated in the FA LSP subobject of the ERO object corresponding to each node of the FA LSP.

The information of the TE link cost, protection attribute and Shared Risk Link Group attribute between two adjacent nodes can be encapsulated in the FA LSP subobject of the ERO object corresponding to the previous node, and also can be encapsulated in the FA LSP subobject of the ERO object corresponding to the next node. The present invention is not limited to a certain particular encapsulation way as long as information of the TE link cost, protection attribute and Shared Risk Link Group attribute is able to be returned to the upper layer head node.

In this example, information of the TE link cost, protection attribute and Shared Risk Link Group attribute is encapsulated in the FA LSP subobject of the ERO object corresponding to each node in the path computation response message and the Path message. For example, the ERO object of the node H2 can encapsulate information of the TE link cost, protection attribute and Shared Risk Link Group attribute of the link H2←→L3, the ERO object of the node L3 encapsulates information of the TE link cost, protection attribute and Shared Risk Link Group attribute of the link L3←→L4, and the ERO object of the node L4 encapsulates information of the TE link cost, protection attribute and Shared Risk Link Group attribute of the link L4←→H5. This encapsulation way can be denoted as {H2, information of the TE link cost, protection attribute and Shared Risk Link Group attribute of the link H2←→L3}, {L3, information of the TE link cost, protection attribute and Shared Risk Link Group attribute of the link L3←→L4} and {L4, information of the TE link cost, protection attribute and Shared Risk Link Group attribute of the link L4←→H5}, and the path computation response message and the Path message can also include the ERO object {H5} of the node H5.

The path computation reply message returned to the upper layer head node H1 by the PCE includes ERO object {H2, information of the TE link cost, protection attribute and Shared Risk Link Group attribute of the link H2←→L3}, {L3, information of the TE link cost, protection attribute and Shared Risk Link Group attribute of the link L3←→L4} and {L4, information of the TE link cost, protection attribute and Shared Risk Link Group attribute of the link L4←→H5}, and the message also includes the ERO object {H5} of the node H5.

Step 3, the upper layer head node H1 constructs the Path message and sends the Path message to the node H2, and the Path message includes information of the TE link cost, protection attribute and Shared Risk Link Group attribute of each link on the FA LSP;

in this Path message, the FA LSP subobject of the ERO object corresponding to each node of the FA LSP encapsulates information of the TE link cost, protection attribute and Shared Risk Link Group attribute of the link between this node and the adjacent downstream node.

Step 3.1, after receiving the Path message, the border node H2 discovers that the node itself is the first node of the FA LSP (the Path message includes role information of the node), obtains by analysis information of the TE link cost, protection attribute and Shared Risk Link Group attribute of each link on the FA LSP from the Path message, and constructs information of the TE link cost, protection attribute and Shared Risk Link Group attribute of the FA and stores it locally;

The way of the H2 constructing information of the TE link cost, protection attribute and Shared Risk Link Group attribute is as follows:

the TE link cost of the FA=(the TE link cost of the link H2←→L3)+(the TE link cost of the link L3←→L4)+(the TE link cost of the link L4←→H5)−1. The construction way of this attribute is defined in the protocol.

The principle of setting protection attribute of the FA is min ((the protection attribute of the link H2←→L3), (the protection attribute of the link L3←→L4), (the protection attribute of the link L4←→H5)). The protection attributes of the link are the Extra Traffic, Unprotected, Shared protection, Dedicated 1:1 protection, Dedicated 1+1 protection, and Enhanced protection ranked from small to large protection capabilities.

The Shared Risk Link Group of the FA=(the Shared Risk Link Group of the link H2←→L3)∪(the Shared Risk Link Group of the link L3←→L4)∪(the Shared Risk Link Group of the link L4←→H5), and "∪" denotes union. The construction way of this attribute is defined in the protocol.

Then, according to a standard connection setup signaling flow, one lower layer LSP is set up between the nodes H2 and H5, and in this connection setup signaling flow, the H2 sends a Path message to the lower layer downstream node L3 at first, and encapsulates information of the TE link cost, protection attribute and Shared Risk Link Group attribute of the FA in the TLV of the LSP_TUNNEL_INTERFACE_ID object in this Path message, as shown in FIG. 3. When the Actions in FIG. 3 are 0, it is denoted that this LSP is for the FA.

Step 3.2, the lower layer node L3 receives the Path message, discovers that the node itself is an intermediate node, and forwards the Path message to the downstream node L4.

Step 3.3, the lower layer node L4 receives the Path message, discovers that the node itself is an intermediate node, and forwards the Path message to the downstream node H5;

step 3.4, after receiving the Path message of the lower layer, the border node H5 discovers that the node itself is the tail node of the FA LSP (the Path message includes role information of nodes), extracts information of attributes of the FA from the TLV of the LSP_TUNNEL_INTERFACE_ID object and stores the information of attributes of the FA locally;

so far, the attribute setup of two ends of the FA is done, namely completing the inheritance of the TE link cost, protection attribute and Shared Risk Link Group attribute of the FA. Steps 3.5-3.7, the border node H5 returns the Reservation (Resv) message of the lower layer to the first node H2 of the FA LSP through the nodes L4 and L3;

step 4, after the node H2 receives the Resv message of the lower layer returned by the node H5, the lower layer connection setup is done, and at this time, the setup of the upper layer connection is awakened, and the process of setting up the upper layer connection is continued. If the FA still has the available bandwidth, the flooding can be carried out for use by other upper layer services when they are reset up.

Steps 5-8, the standard signaling flow of setting up the upper layer service is continued, and herein it will not be described in detail any more.

Example Two

As shown in FIG. 2, the Record Route Object (RRO) in the RSVP is expanded, and the FA LSP subobject is added. In the TLV of the FA LSP subobject, the link attribute information of the FA LSP is filled. Each link attribute is taken as one TLV, and there can be a plurality of TLVs.

Similarly, with reference to the multilayer network in FIG. 4, the flow of the method for inheriting attributes of the FA in this example comprises:

step 1, when the upper layer head node H1 sets up the upper layer service, a path computation request is sent to the PCE.

Step 2, after receiving the request, the PCE returns computed paths to the upper layer head node H1 in the response message of this path computation message;

herein it is still assumed that the searched path is the H1-H2-L3-L4-H5-H6, but does not include the attribute information of each link on the FA LSP.

Step 3, the node H1 sends a Path message to the border node H2;

step 3.1, after receiving the Path message, the border node H2 discovers that the node itself is the head node of the FA LSP, initiates the setup process of the FA LSP to the lower layer node, sends a Path message to the lower layer downstream node L3, and records information of the TE link cost, protection attribute and Shared Risk Link Group attribute of the link of nodes H2←→L3 in the FA LSP subobject of the RRO object corresponding to this node in the Path, which is denoted as {H2, information of the TE link cost, protection attribute and Shared Risk Link Group attribute of the link H2←→L3};

the PCE sends the node and path information included in the FA LSP to the H1 by the computation reply message, and the H1 includes this node and path information in the Path message sent to the H2, and the H2 can know the node role of itself by comparing the node information e.g. the node address included in the FA LSP. After the H2 initiates the setup process of the FA LSP, the H5 can obtain the role information of itself on the FA LSP from the Path message.

Step 3.2, the lower layer node L3 receives the Path message, discovers that the node itself is an intermediate node, and adds information of the TE link cost, protection attribute and Shared Risk Link Group attribute of the link L3←→L4 of the node into the FA LSP subobject of the RRO object corresponding to the node in the Path message;

so far, the RRO object contents of the Path message include {H2, information of the TE link cost, protection attribute and Shared Risk Link Group attribute of the link H2←→L3}, and {L3, information of the TE link cost, protection attribute and Shared Risk Link Group attribute of the link L3←→L4}.

Step 3.3, the lower layer node L4 receives the Path message, discovers that the node itself is an intermediate node, and adds information of the TE link cost, protection attribute and Shared Risk Link Group attribute of the link L4←→H5 of the node into the FA LSP subobject of the RRO object corresponding to the node in the Path message;

so far, the content of the RRO object of the Path message include {H2, information of the TE link cost, protection attribute and Shared Risk Link Group attribute of the link H2←→L3}, {L3, information of the TE link cost, protection attribute and Shared Risk Link Group attribute of the link L3←→L4}, and {L4, information of the TE link cost, protection attribute and Shared Risk Link Group attribute of the link L4←→H5}.

Step 3.4, after receiving the Path message, the border node H5 discovers that the node itself is the tail node of the FA LSP, and according to the link attribute information included in the RRO object corresponding to the previous nodes, computes the TE link cost, protection attribute and Shared Risk Link Group attribute of the FA, and the computation principle is as the example one, and stores the TE link cost, protection attribute and Shared Risk Link Group attribute of the FA locally;

then, the border node H5 returns the Resv message of the lower layer to the lower layer upstream node L4 of the FA LSP, records information of the TE link cost, protection attribute and Shared Risk Link Group attribute of the link L4←→H5 of the node in the FA LSP subobject of the RRO object corresponding to the node itself in the Resv message, which is denoted as the {H5, information of the TE link cost, protection attribute and Shared Risk Link Group attribute of the link L4←→H5}.

Step 3.5, the L4 receives the Resv message, discovers that the node itself is an intermediate node, and adds information of the TE link cost, protection attribute and Shared Risk Link Group attribute of the link L3←→L4 of the node in the FA LSP subobject of the RRO object corresponding to the node in the Resv message, and thus the RRO object in the Resv message sent from the L4 to the L3 includes {H5, information of the TE link cost, protection attribute and Shared Risk Link Group attribute of the link L4←→H5} and {L4, information of the TE link cost, protection attribute and Shared Risk Link Group attribute of the link L3←→L4}.

Step 3.6, after receiving the Resv message, the lower layer node L3 discovers that the node itself is an intermediate node, and adds information of the TE link cost, protection attribute and Shared Risk Link Group attribute of the link H2←→L3 of the node in the FA LSP subobject of the RRO object corresponding to the node itself in the Resv message, and thus the Resv message sent from the L3 to the H2 includes {H5, information of the TE link cost, protection attribute and Shared Risk Link Group attribute of the link L4←→H5}, {L4, information of the TE link cost, protection attribute and Shared Risk Link Group attribute of the link L3←→L4} and {L3, information of the TE link cost, protection attribute and Shared Risk Link Group attribute of the link H2←→L3};

step 4, after receiving the Resv message, the border node H2 discovers that the node itself is the head node of the FA LSP, and then according to the link attribute information included in the RRO object corresponding to the previous nodes, synthetically computes the TE link cost, protection attribute and Shared Risk Link Group attribute, and the computation principle is as the example one, and stores the TE link cost, protection attribute and Shared Risk Link Group attribute locally;

so far, the attribute setup of two ends of the FA is done, namely completing the inheritance of attributes of the FA. After the lower layer connection is set up, the H2 sends the Path message of the upper layer to the H5. If the FA further has the available bandwidth, the flooding can be carried out for use in resetting up other upper layer services.

Steps 5-8, the standard setup process of the upper layer LSP is continued and it will not be described in detail any more.

The present invention provides a multilayer network which can implement inheritance of attributes of the Forwarding Adjacency (FA), and this multilayer network adopts the upper layer signaling triggered model to set up the FA, and comprises a path computation element, and the head node on the Forwarding Adjacency Label Switched Path (FA LSP) and the tail node on said FA LSP, wherein:

said path computation element is configured to: return information of the first attribute of each link on the FA LSP included in the computed paths in a response message of the routing inquiry to the upper layer head node which initiates the inquiry, and this first attribute is a part of attributes which require constructing and obtaining according to corresponding attributes of each link on the FA LSP in the FA, and information of the first attribute of each link on this FA LSP is encapsulated in the FA LSP subobject of the ERO object corresponding to the node on the FA LSP;

the head node on said FA LSP is configured to: construct the first attribute of this FA according to information of the first attribute of each link on the FA LSP encapsulated in the FA LSP subobject of the ERO object corresponding to the node on the FA LSP in the Path message sent from the upstream node, store the first attribute of this FA and encapsulate information of the first attribute of this FA in the FA LSP subobject of the ERO object corresponding to the node on the FA LSP in the Path message, and send the Path message to the tail node on the FA LSP;

the tail node on said FA LSP is configured to: obtain information of the first attribute of this FA from the Path message and store the information.

Wherein the first attribute of said FA includes one or any combination of the Traffic Engineering (TE) link cost, protection attribute and Shared Risk Link Group attribute; wherein the protection attribute of the FA is equal to the protection attribute of the minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

The present invention also provides a multilayer network which can implement inheritance of attributes of the Forwarding Adjacency (FA), and this multilayer network adopts the upper layer signaling triggered model to set up the FA, and comprises each node on the Forwarding Adjacency Label Switching Path (FA LSP), wherein:

the head node on said FA LSP is configured to: add information of the first attribute of the link between the node and the downstream adjacent node in the FA LSP subobject of the Record Route Object (RRO) corresponding to the node in the Path message sent to this downstream adjacent node, and obtain information of the first attribute of each link on this FA LSP from a Reservation (Resv) message, and construct the first attribute of this FA and store it;

an intermediate node of said FA LSP is configured to: add information of the first attribute of the link between the node and the downstream adjacent node in the FA LSP subobject of the RRO corresponding to the node in the Path message sent to this downstream adjacent node, and add information of the first attribute of the link between the node and the upstream adjacent node in the FA LSP subobject of the RRO corresponding to the node in the Resv message sent to this upstream adjacent node;

the tail node of said FA LSP is configured to: add information of the first attribute of the link between the node and the upstream adjacent node in the FA LSP subobject of the RRO corresponding to the node in the Resv message sent to this upstream adjacent node, and obtain information of the first attribute of each link on this FA LSP from the Path message, construct the first attribute of this FA and store it;

said first attribute is a part of attributes which require constructing and obtaining according to corresponding attributes of each link on the FA LSP among the FA attributes.

Wherein the first attribute of said FA includes one or any combination of the Traffic Engineering (TE) link cost, protection attribute and Shared Risk Link Group attribute; wherein the protection attribute of the FA is equal to the protection attribute of the minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

The present invention also provides a node which can implement inheritance of attributes of the Forwarding Adjacency (FA), and said node is configured to:

when the node acts as the head node of the FA LSP, add information of the first attribute of the link between the node and the downstream adjacent node in the FA LSP subobject of the Record Route Object (RRO) corresponding to the node in the Path message sent to this downstream adjacent node, obtain information of the first attribute of each link on this FA LSP from a Reservation (Resv) message, and construct the first attribute of this FA and store it; or, when the node acts as an intermediate node on the FA LSP, add information of the first attribute of the link between the node and the downstream adjacent node in the FA LSP subobject of the RRO corresponding to the node in the Path message sent to this downstream adjacent node, and add information of the first attribute of the link between the node and the upstream adjacent node in the FA LSP subobject of the RRO corresponding to the node in the Resv message sent to this upstream adjacent node; or, when the node acts as the tail node on the FA LSP, add information of the first attribute of the link between the node and the upstream adjacent node in the FA LSP subobject of the RRO corresponding to the node in the Resv message sent to this upstream adjacent node, obtain information of the first attribute of each link on this FA LSP from the Path message, and construct the first attribute of this FA and store it;

said first attribute is a part of attributes which require constructing and obtaining according to corresponding attributes of each link on the FA LSP among the FA attributes.

INDUSTRIAL APPLICABILITY

Comparing with the prior art, the present invention expands the Explicit Route Object (ERO) in the Resource reSerVation Protocol (RSVP) and the Path Computation Element communication Protocol (PCEP), adds the FA LSP subobject, expands the Record Route Object (RRO) in the RSVP, and adds the FA LSP subobject, and the FA LSP subobject includes the Type, Length, Value (TLV) of the FA attributes, and the present invention provides newly expanded subobjects, has the PCEP protocol and the RSVP protocol coordinated, and implements the inheritance of attributes of the FA which require constructing and obtaining according to corresponding attributes of each link on the FA LSP in the upper layer signaling triggered FA LSP automatic setup model.

What is claimed is:

1. A method for inheriting an attribute of a Forwarding Adjacency (FA) in a multilayer network, the multilayer network adopting an upper layer signaling triggered model to set up the FA, and the method for inheriting the attribute comprising:

a) a path compute element returning information of a first attribute of each link on a Forwarding Adjacency Label Switched Path (FA LSP) included in a computed path in a path computation reply message to an upper layer head node initiating the inquiry, wherein, the first attribute of each link is any one or any combination of a Traffic Engineering (TE) cost, a FA LSP protection attribute and a shared risk link group attribute; the upper layer head node initiating connection setup according to a path of the path computation reply message;

b) a head node on the FA LSP constructing the first attribute of the FA according to the information of the first attribute of each link on the FA LSP included in a path message sent from a upstream node, storing the first attribute of the FA and sending information of the first attribute of the FA to a tail node on the FA LSP by the path message; and c) the tail node on the FA LSP obtaining the information of the first attribute of the FA from said path message and storing the information of the first attribute of the FA.

2. The method for inheriting the attribute as claimed in claim 1, further comprising:

before step a), expanding an Explicit Route Object (ERO) in a resource reservation protocol and a path computation element communication protocol, and adding a FA LSP subobject in the ERO;

wherein, in step a), the information of the first attribute of each link on said FA LSP in the path computation reply message is encapsulated in the FA LSP subobject of an ERO object corresponding to a node on the FA LSP;

wherein, in step b), the information of the first attribute of each link on said FA LSP in said path message is encapsulated in the FA LSP subobject of the ERO object corresponding to the node on the FA LSP.

3. The method for inheriting the attribute as claimed in claim 2, wherein the first attribute of said FA includes one or any combination of the TE cost, the protection attribute and the shared risk link group attribute.

4. The method for inheriting the attribute as claimed in claim 3, wherein the protection attribute of said FA is equal to a protection attribute with minimal protection capacity among protection attributes of each link on the FA LSP, and the protection attributes of each link are extra services, unprotected, shared protection, dedicated 1:1 protection, dedicated 1+1 protection and enhanced protection ranked from small to large protection capacities.

5. The method for inheriting the attribute as claimed in claim 1, wherein said step of sending information of the first attribute of the FA to the tail node on the FA LSP by the path message comprises: the head node on said FA LSP encapsulating the information of the first attribute of the FA in a LSP tunnel interface identification object in the path message, and sending the path message to the tail node on the FA LSP through an intermediate node on said FA LSP.

6. The method for inheriting the attribute as claimed in claim 5, wherein the first attribute of said FA includes one or any combination of the TE cost, the protection attribute and the shared risk link group attribute.

7. The method for inheriting the attribute as claimed in claim 6, wherein the protection attribute of said FA is equal to a protection attribute with minimal protection capacity among protection attributes of each link on the FA LSP, and the protection attributes of each link are extra services, unprotected, shared protection, dedicated 1:1 protection, dedicated 1+1 protection and enhanced protection ranked from small to large protection capacities.

8. The method for inheriting the attribute as claimed in claim 1, wherein the first attribute of said FA includes one or any combination of the TE cost, the protection attribute and the shared risk link group attribute.

9. The method for inheriting the attribute as claimed in claim 8, wherein the protection attribute of said FA is equal to a protection attribute with minimal protection capacity among protection attributes of each link on the FA LSP, and the protection attributes of each link are extra services, unprotected, shared protection, dedicated 1:1 protection, dedicated 1+1 protection and enhanced protection ranked from small to large protection capacities.

10. The method for inheriting the attribute as claimed in claim 1, further comprising:

before step a), said upper layer head node adding indication information for indicating that the path compute element is required to return the information of the first attribute of each link on the FA LSP in a path computation request sent to the path compute element; in step a), when the path computation request includes said indication information and the computed paths include the FA LSP, said path computation element returning the information of the first attribute of each link on the FA LSP to said upper layer head node.

11. A method for inheriting an attribute of a Forwarding Adjacency (FA) in a multilayer network, the multilayer network adopting an upper layer signaling triggered model to set up the FA, and the method for inheriting the attribute comprising:

A) in a connection setup process of a Forwarding Adjacency Label Switched Path (FA LSP), each node on the FA LSP adding information of a first attribute of a link between the node and a downstream adjacent node in a path message sent to the downstream adjacent node, the first attribute is any one or any combination of a Traffic Engineering (TE) cost, a FA LSP protection attribute and a shared risk link group attribute, and a tail node of the FA LSP obtaining information of the first attribute of each link on the FA LSP from said path message, constructing the first attribute of the FA and storing the first attribute of the FA; and B) each node on the FA LSP adding information of a first attribute of a link between the node and an upstream adjacent node in a reservation (Resv) message sent to the upstream adjacent node, a head node of the FA LSP obtaining information of the first attribute of each link on the FA LSP from said Resv message, constructing and storing the first attribute of the FA.

12. The method for inheriting the attribute as claimed in claim 11, further comprising:

before step A), expanding a Record Route Object (RRO) in a resource reservation protocol, and adding a FA LSP subobject;

wherein, in step A), the information of the first attribute of the link between the node and the downstream adjacent node in said path message is added in the FA LSP subobject of the RRO corresponding to the node;

wherein, in step b), the information of the first attribute of the link between the node and the upstream adjacent node in said Resv message is added in the FA LSP subobject of the RRO corresponding to the node.

13. The method for inheriting the attribute as claimed in claim 12, wherein the first attribute of said FA includes one or any combination of the TE cost, the protection attribute and the shared risk link group attribute.

14. The method for inheriting the attribute as claimed in claim 11, wherein
the first attribute of said FA includes one or any combination of the TE cost, the protection attribute and a shared risk link group attribute.

15. The method for inheriting the attribute as claimed in claim 14, wherein
the protection attribute of said FA is equal to a protection attribute with minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

16. A multilayer network for implementing inheritance of an attribute of a Forwarding Adjacency (FA), the multilayer network adopting an upper layer signaling triggered model to set up the FA, the multilayer network comprising a path compute element and each node on a Forwarding Adjacency Label Switched Path (FA LSP), and said each node comprising a head node and a tail node, wherein:
said path compute element is configured to: return information of a first attribute of each link on the FA LSP included in computed paths in a path computation reply message to an upper layer head node initiating the inquiry, and the first attribute is any one or any combination of a Traffic Engineering (TE) cost, a FA LSP protection attribute and a shared risk link group attribute, and the information of the first attribute of each link on the FA LSP is encapsulated in an expanded FA LSP subobject of an Explicit Route Object (ERO) object corresponding to the node on the FA LSP;
the head node on said FA LSP is configured to: construct the first attribute of the FA according to the information of the first attribute of each link on the FA LSP encapsulated in the expanded FA LSP subobject of the ERO object corresponding to the node on the FA LSP in a path message sent from an upstream node and store the first attribute of the FA, and encapsulate the information of the first attribute in the LSP_TUNNEL_INTERFACE_ID object in the path message, and send the path message to the tail node on the FA LSP;
the tail node on said FA LSP is configured to: obtain the information of the first attribute of the FA from said path message and store the information of the first attribute of the FA.

17. The multilayer network as claimed in claim 16, wherein
the first attribute of said FA includes one or any combination of the TE cost, the protection attribute and the shared risk link group attribute; wherein the protection attribute of said FA is equal to a protection attribute with minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

18. A multilayer network for implementing inheritance of an attribute of a Forwarding Adjacency (FA), the multilayer network adopting an upper layer signaling triggered model to set up the FA, and the multilayer network comprising each node on a Forwarding Adjacency Label Switched Path (FA LSP), wherein:
a head node of said FA LSP is configured to: add information of a first attribute of a link between the node and a downstream adjacent node in a FA LSP subobject of a Record Route Object (RRO) corresponding to the node in a path message sent to the downstream adjacent node, and obtain the information of the first attribute of each link on the FA LSP from a reservation (Resv) message, construct the first attribute of the FA and store the first attribute of the FA;
an intermediate node of said FA LSP is configured to: add information of a first attribute of a link between the node and a downstream adjacent node in the FA LSP subobject of the RRO corresponding to the node in the path message sent to the downstream adjacent node, and add information of a first attribute of a link between the node and an upstream adjacent node in the FA LSP subobject of the RRO corresponding to the node fin the Resv message sent to the upstream adjacent node;
a tail node of said FA LSP is configured to: add information of a first attribute of a link between the node and an upstream adjacent node in the FA LSP subobject of the RRO corresponding to the node in the Resv message sent to the upstream adjacent node; and obtain the information of the first attribute of each link on the FA LSP from the path message, construct the first attribute of the FA and store the first attribute of the FA;
said first attribute is a part of attributes requiring constructing and obtaining according to corresponding attributes of each link on the FA LSP among attributes of the FA.

19. The multilayer network as claimed in claim 18, wherein
the first attribute of said FA includes one or any combination of a Traffic Engineering (TE) cost, a protection attribute and a shared risk link group attribute; wherein the protection attribute of said FA is equal to a protection attribute with minimal protection capacity among protection attributes of each link on the FA LSP, and protection attributes of the link are extra services, unprotected, shared protection, dedicated 1:1 protection, dedicated 1+1 protection and enhanced protection ranked from small to large protection capacities.

20. A node for implementing inheritance of an attribute of a Forwarding Adjacency (FA), and said node being configured to:
when the node acts as a head node, add information of a first attribute of a link between the node and a downstream adjacent node in a FA LSP subobject of a Record Route Object (RRO) corresponding to the node in a path message sent to the downstream adjacent node, and obtain the information of the first attribute of each link on the FA LSP from a reservation (Resv) message, construct the first attribute of the FA and store the first attribute of the FA; or
when the node acts as an intermediate node, add information of a first attribute of a link between the node and a downstream adjacent node in the FA LSP subobject of the RRO corresponding to the node in the path message sent to the downstream adjacent node, and add information of a first attribute of a link between the node and an upstream adjacent node the FA LSP subobject of the RRO corresponding to the node in the Resv message sent to the upstream adjacent node; or
when the node acts as a tail node, add information of a first attribute of a link between the node and an upstream adjacent node the FA LSP subobject of the RRO corresponding to the node in the Resv message sent to the upstream adjacent node; and obtain information of the first attribute of each link on the FA LSP from the path message, construct the first attribute of the FA and store the first attribute of the FA;

said first attribute is a part of attributes requiring constructing and obtaining according to corresponding attributes of each link on the FA LSP among attributes of the FA.

\* \* \* \* \*